W. H. OSTRANDER.
MILKER'S TAIL CLAMP.
APPLICATION FILED DEC. 21, 1909.
987,594.
Patented Mar. 21, 1911.
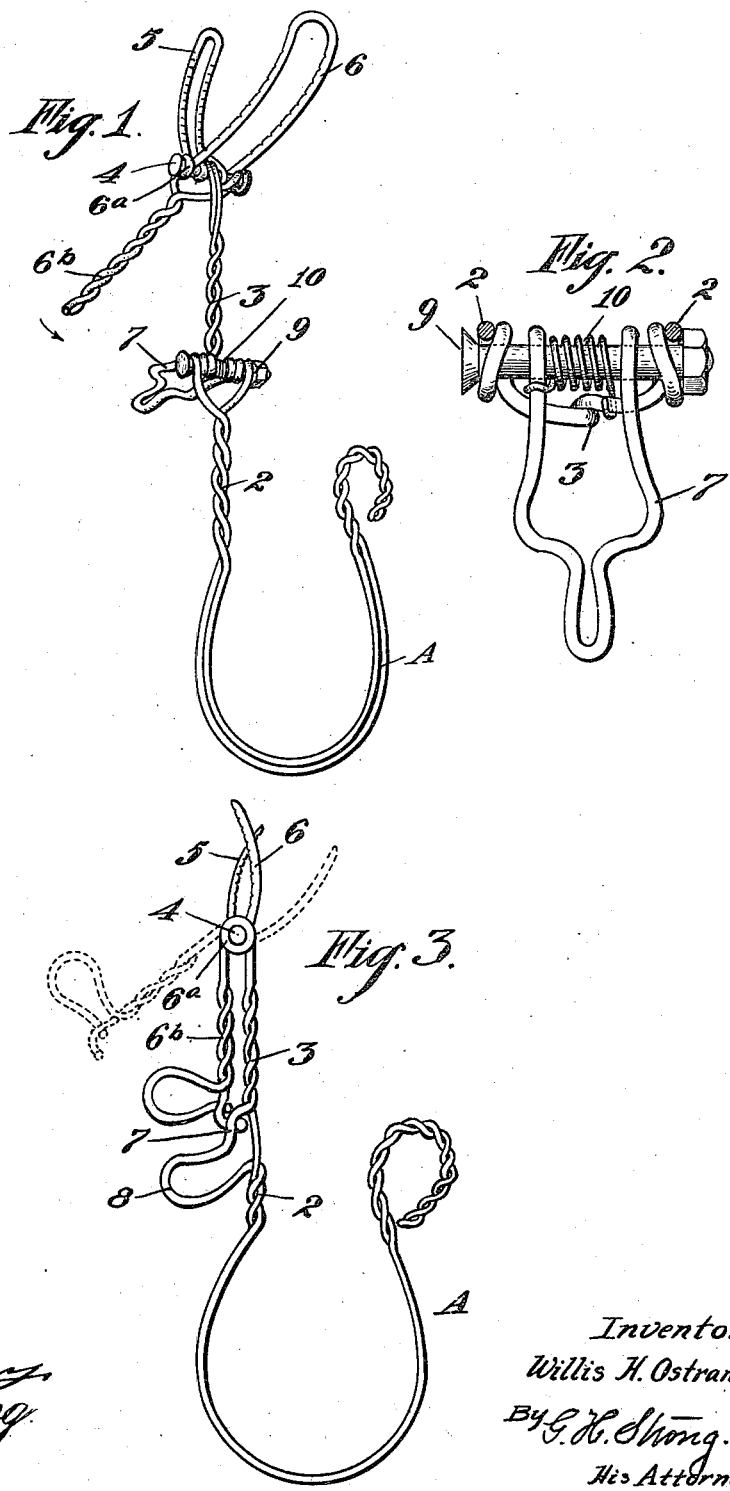
Witnesses;
Inventor
Willis H. Ostrander
By G. H. Strong.
His Attorney.

UNITED STATES PATENT OFFICE.

WILLIS H. OSTRANDER, OF PARADISE, CALIFORNIA.

MILKER'S TAIL-CLAMP.

987,594.  Specification of Letters Patent.  Patented Mar. 21, 1911.

Application filed December 21, 1909.  Serial No. 534,358.

*To all whom it may concern:*

Be it known that I, WILLIS H. OSTRANDER, a citizen of the United States, residing at Paradise, in the county of Butte and State of California, have invented new and useful Improvements in Milkers' Tail-Clamps, of which the following is a specification.

My invention relates to a device for holding the tails of cows while being milked to prevent their striking the milker in the face.

It consists of a hinged clamp adapted to grip the tail of the cow, and in conjunction therewith of a curved elastic yoke which will fit around the animal's leg at a point just above the hock joint; a latching device intermediate of the two enables the operator to immediately apply or remove the device at will.

The invention also comprises a combination of parts, and details of construction which will be more fully explained by reference to the accompanying drawings, in which—

Figure 1 is a perspective view of the invention. Fig. 2 is a detail of the spring latch, in inverted plan. Fig. 3 is another form of the invention.

During the operation of milking cows by hand, the milker is often seriously annoyed and punished about the head and face by the whipping of the animal's tail in its effort to dislodge flies and insects. It is for the purpose of protecting the milker that I have devised the present invention.

A is an elastic yoke, which may be made of wire or other suitable material, and having such a curvature that it is easily slipped upon that portion of the hind leg of the cow which is just above the hock joint, and being thus attached it will hold the device in place by its elasticity.

The device may be made of twisted wire, as shown, and at one end of this yoke portion it is coiled, as shown at 2, and from this point forms an upward extension 3 which is again coiled about a transverse bar or pin 4, thence extending upwardly, the bight of the upwardly extending portion forms one side 5 of a stationary holding jaw. The other moving side 6 is curved in the opposite direction, the two sides presenting their concaved faces toward each other, and the extension 6 is coiled around the pin 4, as shown at 6ª, thence it extends downwardly forming an arm extension 6ᵇ. This extension is adapted to engage a latching device 7. This device may be made by bending one of the wires between the portions 2 and 3 of the yoke extension so as to form a loop 8, and the end of the arm 6ᵇ may be bent so as to engage this loop, the wires being sufficiently elastic to allow the engaging portion to be readily sprung away to be disengaged, as shown in Fig. 3. In another form, the portion 2 of the yoke is coiled once or twice around a horizontal pin 9 similar to that shown at 4, and the latch consists of wires bent to form an engagement for the end of the arm 6ᵇ. The latch portion is spring-actuated so that by pulling it down against the spring 10, the end of the arm 6ᵇ may be made to engage with the opening formed between the wires.

The operation would then be as follows: The jaws 5 and 6 being opened or separated by moving the arm 6ᵇ backwardly, the end of the animal's tail may be gripped between the jaws, the arm 6ᵇ then being pushed into engagement with the latch 7 will hold it firmly. It is then only necessary to slip the loop A over the animal's leg above the hock joint, when the tail will be held and prevented from such motion as will annoy the milker.

Having thus described my invention, what I claim and desire to secure by Letters Patent is—

An improved animal tail-holding device consisting of a pair of opposed jaws formed of bent and twisted wires, one of said jaws having an arm extension and an intermediate coil, a pin around which the coil is turnable, a fixed jaw opposed to the first-named jaw having a portion coiled around the pin, an extension corresponding with and forming a prolongation of the arm of the first-named jaw, and a curved open-sided elastic yoke having one portion connecting with said arm and another portion adapted to clasp the leg of the animal, and a latching device adapted to engage the movable arm of the first-named jaw after the tail has been gripped between the jaws.

In testimony whereof I have hereunto set my hand in the presence of two subscribing witnesses.

WILLIS H. OSTRANDER.

Witnesses:
W. C. SMITH,
WM. S. KERR.

Copies of this patent may be obtained for five cents each, by addressing the "Commissioner of Patents, Washington, D. C."